United States Patent [19]

Conder et al.

[11] 4,082,879

[45] Apr. 4, 1978

[54] STABILIZED TRANSPARENT RECEPTOR SHEET

[75] Inventors: Terrence M. Conder, Stillwater; Kevin P. O'Leary, Arden Hills, both of Minn.

[73] Assignee: Minnesota Mining and Manufacturing Company, St. Paul, Minn.

[21] Appl. No.: 702,849

[22] Filed: Jul. 6, 1976

Related U.S. Application Data

[63] Continuation-in-part of Ser. No. 601,717, Aug. 4, 1975, abandoned.

[51] Int. Cl.[2] ........................ B32B 27/08; B32B 27/36

[52] U.S. Cl. .................................. 428/219; 428/483; 428/411; 428/518; 428/148; 428/520; 428/539; 96/48 HD; 427/383 R; 427/384

[58] Field of Search ........................ 428/411, 219, 483; 96/48 HD; 427/383, 384

[56] References Cited

U.S. PATENT DOCUMENTS

| | | | |
|---|---|---|---|
| 3,460,964 | 8/1969 | Dunham | 428/411 |
| 3,819,664 | 6/1974 | Burleigh | 96/1.5 X |
| 3,832,212 | 8/1974 | Jenkins et al. | 428/411 |
| 3,906,138 | 9/1975 | Evensen | 428/411 X |
| 3,935,012 | 1/1976 | Elan | 96/48 R |
| 3,961,948 | 6/1976 | Saeva | 96/48 R X |

*Primary Examiner*—P. C. Ives

*Attorney, Agent, or Firm*—Cruzan Alexander; Donald M. Sell; James V. Lilly

[57] ABSTRACT

Transparent receptor sheets containing reducible metal soap and organic reducing agent are stabilized against background darkening on prolonged exposure to heat and light by means of a small amount of aromatic dye.

10 Claims, No Drawings

STABILIZED TRANSPARENT RECEPTOR SHEET

This is a continuation-in-part of application Ser. No. 601,717, filed Aug. 4, 1975 and now abandoned.

This invention relates to transparent receptor sheets. More particularly, the invention relates to the stabilization of imageable receptor sheets containing reducible metal soap and organic reducing agent.

In U.S. Pat. No. 3,935,012, incorporated herein by reference, there are described light-sensitive intermediate sheets comprising (a) photolyzable heat-stable source of hydrogen halide, (b) acid-cleavable adduct of a first reactant and an organic compound containing a vinyl ether linkage, said adduct being capable of supplying a reducing agent when cleaved with acid, and (a) acid acceptor for said hydrogen halide in an amount less than sufficient to retain all of the hydrogen halide available from said photolyzable source upon exposure to a light image. When this sheet is exposed to a light image hydrogen halide is formed which cleaves the said adduct so as to free a reducing agent at light-exposed areas. The intermediate sheet is then placed against a receptor sheet containing a second reactant (e.g., reducible metal soap and organic reducing agent such as hindered phenol) and heated so as to induce a visible image-forming reaction. An image is formed on the receptor sheet due to reduction of a portion of the metal soap (to the metal) by reaction thereof with the liberated reducing agent from the light-struck areas of the intermediate sheet. This then catalyzes the heat-induced reduction of the remaining metal soap by the less reactive organic reducing agent originally present in the receptor to form a visible image.

Although the receptor sheet which has been imaged in accordance with the foregoing procedure is of good quality and is very easy to use, it has been found that those receptor sheets which are comprised of reducible metal soap and organic reducing agent tend to exhibit unacceptable increases in background optical density when exposed for a prolonged period of time (e.g., 2 hours or more) on a conventional overhead projector. During image formation a small amount of material from the non-light-exposed areas of the intermediate sheet is transferred to the receptor sheet. Thus, when the imaged receptor sheet is used on an overhead projector, sufficient reducing agent is liberated so as to bring about the increase in background optical density. The present invention overcomes this problem of background optical density increase by including in the receptor sheet a small amount of aromatic dye.

In accordance with the present invention there is provided a receptor sheet comprising a transparent backing having a coating thereover including a film-forming binder, reducible metal soap and organic reducing agent, wherein the improvement comprises including in said coating an effective amount of a polycyclic aromatic dye compound having a "development characteristic" (described hereinafter) of at least 150 seconds.

The improved receptor sheets of the invention, after being imaged, may be projected for prolonged periods on conventional overhead projectors without objectionable increase in the optical density of background areas. It is theorized that the polycyclic aromatic dye stabilizes the receptor sheet by retarding the reduction of the metal soap by the liberated reducing agent in background areas.

The receptor sheets with which the present invention is primarily concerned typically comprise a transparent backing (so that light may be projected therethrough) having a coating thereover including a film-forming polymeric or resinous binder, a reducible metal soap and an organic reducing agent. Optionally the coating may also contain a toner (e.g., phthalazinone) for the metal image, or fillers or various other additives.

Preferably the backing is a thin, flexible, transparent plastic film or the like of a type which is known in the art as being useful for use in a projection transparency.

The reducible metal soap present in the receptor sheet is preferably a silver soap of a long chain fatty acid (e.g., silver behenate, silver stearate), although other reducible metal soaps such as ferric stearate, gold stearate, cerium stearate, etc. are also useful. Still other useful reducible metal soaps are known in the art.

The organic reducing agents which are useful in the receptor sheets are also well known in the art and include, as representative examples, pyrogallol; 4-azeloyl-bis-pyrogallol; 4-stearoyl pyrogallol; gallacetophenone; di-tertiary-butyl pyrogallol; gallic acid anilide; methyl gallate, ethyl gallate; normal and isopropyl gallate; butyl gallate; dodecyl gallate; gallic acid; ammonium gallate; ethyl protocatechuate; cetyl protocatechuate; 2,5-dihydroxy benzoic acid; 1-hydroxy-2-naphthoic acid; 2-hydroxy, 3-naphthoic acid; phloroglucinol; catechol; 2,3-naphthalene diol; 4-lauroyl catechol; sodium gallate; protocatechualdehyde; 4-methyl esculetin; 3,4-dihydroxy benzoic acid; 2,3-dihydroxy benzoic acid; hydroquinone; 4,4'-dihydroxy biphenyl; 3,4-dihydroxyphenylacetic acid; 4(3',4'-dihydroxyphenylazo) benzoic acid; 2,2-methylene bis-3,4,5-trihydroxybenzoic acid; ortho- and paraphenylene diamine; tetramethyl benzidine; 4,4',4"-diethylamino triphenylmethane; o-, m- and p-aminobenzoic acids; alpha and beta naphthols; 4-methoxy, 1-hydroxy-dihydronaphthalene; and tetrahydroquinoline. These compounds are cyclic or aromatic compounds having an active hydrogen atom attached to an atom of carbon, oxygen or nitrogen which in turn is attached to an atom of the cyclic ring. They are capable of causing the reduction of metal ion and precipitation of metal on being dissolved at moderate temperature in a solution of aqueous metal salt in an organic solvent.

The reducible metal salt and organic reducing agent are preferably intermixed prior to coating, but may be applied in separate but contiguous layers if desired, with the aromatic dye being present in the layer containing the reducible metal salt.

Various types of film-forming binders may be used in the receptor sheets. For example, one may use cellulose propionate resin, polyethyl methacrylate resin, polyvinyl acetate, polyvinyl acetate/vinyl chloride copolymer, and cellulose acetate butyrate. Other conventional binders are well known in the art.

The relative amounts of reducible metal soap and organic reducing agent present in the receptor may vary, although there should be a sufficient amount of each present so as to be capable of forming a visible and distinct image when heated in the presence of the reactant (i.e., reducing agent) supplied by the intermediate sheet described above. Generally speaking, the amount of reducible metal soap present is about 4 to 12 parts by weight per part of organic reducing agent present.

The types of aromatic dyes which are useful in the receptor sheet to alleviate increase in background optical density have not been entirely definable in terms of chemical classification of dyestuffs. Fortunately, however, a simple test has been developed which accurately distinguishes between those aromatic dyes which are useful and those which are not. This test procedure is as follows: A solution is first prepared using the following ingredients in the amounts shown:

| | | |
|---|---|---|
| Cellulose acetate propionate ("EAP 482-20", available from Eastman) | 5 | grams |
| Methylethylketone | 95 | grams |
| Aromatic dye to be tested | 0.10 | millimoles |
| 4-methoxy-1-naphthol | 0.575 | millimoles |

Then 15 grams of this solution is poured into an aluminum dish (to a depth of 0.5 inch) and irradiated at a distance of 6 inches for 1 hour with a 150 watt General Electric tungsten filament light source. Thereafter the irradiated solution is coated (at 50 microns wet thickness) onto a receptor sheet (6 months or less in age and which is described below), followed by drying at 65° C. After drying, the receptor sheet is heated at 100° C. (212° F.). The time required for the optical density of the receptor sheet to show an increase 0.85 is recorded as the "development characteristic" for the particular dye being tested. Those dyes which are useful in the present invention exhibit a "development characteristic" of at least 150 second. Preferably the dyes exhibit a "development characteristic" of at least 300 seconds. In this test procedure the optical density is measured using a conventional MacBeth Model TD 404A densitometer with a yellow filter.

The receptor sheet used in the foregoing test is prepared as follows: A silver behenate dispersion is prepared using the following ingredients in the amounts shown:

| | Parts by Wt. |
|---|---|
| Silver behenate | 12.00 |
| Tetrachlorophthalic anhydride | 0.24 |
| Stannous stearate | 0.0072 |
| Methylethylketone | 87.7528 |
| | 100.0000 |

The above ingredients are mixed for ½ hour, then homogenized at 8000 psi, cooled to 80° F., and homogenized again at 8000 psi.

A binder solution is prepared with the following ingredients:

| | Parts |
|---|---|
| Tenite H4 ® cellulose acetate butyrate resin (available from Eastman) | 7.50 |
| Elvacite 2042 ® polyethylmethacrylate resin (available from E. I. du Pont) | 7.50 |
| Methylethylketone | 85.00 |
| | 100.00 |

A coating composition is then prepared using the following ingredients:

| | Parts |
|---|---|
| Silver behenate dispersion | 54.5531 |
| Binder solution | 43.6400 |
| Phthalazinone | 0.9819 |
| 2,6-di-t-butyl-p-cresol | 0.7850 |
| 4,4'-methylene-bis-2,6-di-t-butylphenol | 0.0400 |
| | 100.0000 |

The above ingredients are thoroughly blended and then coated onto a transparent plastic film at an orifice of 3.5 mils (87.5 microns) and dried in a forced air oven (3 minutes at 180° F.) to leave a dried, clear and transparent coating of 0.70 grams per square foot. A top coating is then applied using a 5% solution of cellulose acetate propionate in methylethylketone (coated at a wet thickness of 50 microns and dried to leave a dry coating of 5 microns).

A preferred class of useful polycyclic aromatic dyes having a "development characteristic" of at least 150 seconds are oxygen-sensitizing dyes comprising at least two moieties in conjugate relationship as part of a single chromophore, each said moiety comprising three linearly kata condensed six-membered aromatic rings, an -OZ group being attached to the meso position of each said moiety, wherein Z is a stable, monovalent radical; said -OZ group being a solubilizing group for said compound. Preferably, at least one auxochromic group comprising an atom having an atomic weight of at least 31 is bonded to said chromophore, said atom being attached directly to said chromophore. The above-mentioned moieties comprising three linearly kata condensed six-membered aromatic rings may be described pictorially as follows:

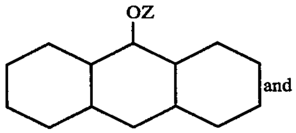
and
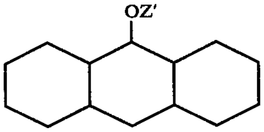

The aromatic rings may be homocyclic (carbon atoms) or heterocyclic, the hetero atoms being generally nitrogen. Of course, a single compound can contain both homocyclic and heterocyclic moieties of the type just described, or the compound may contain only homocyclic or only heterocyclic moieties.

These moieties are in conjugate relationship in the dye compound so that these moieties are part of a single chromophore (i.e., part of the same chromophore). A chromophore may be defined as a group of atoms or electrons in a molecule which is chiefly responsible for an absorption band, as defined in Theory and Application of Ultraviolet Spectroscopy; Jaffe and Orchin; John Wiley & Sons, Inc. (1962), incorporated herein by reference. The two moieties may be bonded or condensed together in peri fashion, e.g.,

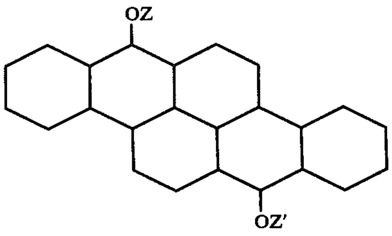

or

-continued

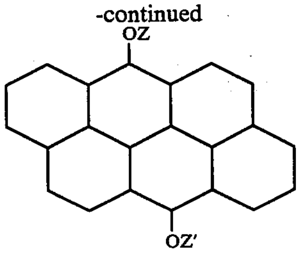

wherein the two moieties share atoms, or the moieties may be attached to each other in conjugate relationship through at least one linking moiety. The linking moieties are selected from the group consisting of (a) atoms which are at least trivalent and which are capable of forming covalent bonds, e.g., nitrogen, carbon, sulfur and oxygen, (b) ligands, having two or more atoms, which are at least bidentate (e.g., such ligands can be bidentate, tridentate, quadradentate, hexadentate, octadentate, etc.), and (c) covalent single or double bonds.

The size, chemical nature or structure of the linking moiety is not critical so long as the two moieties comprising the kata condensed aromatic rings are attached to each other in conjugate relationship such that they are part of a single chromophore.

The linking moiety, of course, can be a polycyclic structure (homocyclic or heterocyclic). Hetero aroms in the heterocyclic linking moieties are generally nitrogen, oxygen and sulfur.

In many of the compounds there are two linking moieties. For example, there may be two ligands, one ligand and a covalent bond, two covalent bonds, etc., as linking moieties in a single compound.

Preferably, these dye compounds have at least one auxochromic group bonded to the chromophore thereof. These preferred dyes are described in U.S. Pat. No. 3,819,664, incorporated herein by reference. The auxochromic groups may consist of one atom or of many atoms, so long as a heavy atom (i.e., having an atomic weight of at least 31), present as part of the auxochromic group, is bonded directly to the chromophore portion of the dye. An auxochromic group may be defined as a group bonded to a chromophore which influences the nature of the excited states, as defined in Theory and Application of Ultraviolet Spectroscopy; Jaffe and Orchin; John Wiley & Sons, Inc. (1962).

Preferred single atom auxochromic groups include chlorine, bromine, mercury, sulfur, iodine and selenium. Other useful single atom auxochromic groups include phosphorus (treated herein as having an atomic weight of 31), arsenic, tellurium, germanium, tin, lead and antimony. The auxochromic group may consist of more than one atom so long as a heavy atom present as part of the auxochromic group is directly bonded to the chromophore portion of the dye.

Although the —OZ and —OZ′ groups which are present on the dye compounds are also auxochromic groups, it has been found that the —OZ and —OZ′ groups are primarily solubilizing groups for the compound, i.e., they primarily determine the solubility of the dye compound in various solvent media into which the dye may be placed. Thus, the chemical structure and nature of the Z and Z′ radicals are not critical.

Generally, it may be said that Z and Z′ are monovalent radicals which are stable under ambient conditions and which do not cause decomposition of the chromophore portion of the dye compound. That is, these radicals do not oxidize or reduce the chromophore portion of the dye compound nor do they destroy or adversely affect the effectiveness of the compound as a dye. Within these limitations the —OZ and —OZ′ radicals can be stable derivatives of an inorganic acid, e.g., —O-$SO_3Y+$ where Y is an alkali metal, alkaline earch metal, or ammonium ion; $OPO_3R_2$ where R is hydrogen or a stable organic radical; and —$OPO_2R_2$ where R is hydrogen or a stable organic radical.

Insofar as organic radicals are concerned, Z and Z′ may be alkyl, cycloalkyl, substituted alkyl and cycloalkyl, alkenyl, alkynyl, aryl, polycyclic, acyl, alkaryl or aralkyl. Z and Z′ may be the same or different. Alkyl radicals having one carbon or more are common Z radicals, and lower alkyl radicals are preferred, although long chain alkyls are also useful. Substituted alkyl radicals are herein defined to include alkyl radicals which are substituted with any moiety or group other than hydrogen atoms and other alkyl radicals.

In addition to the —OZ and —OZ′ solubilizing groups and the auxochromic groups the above classes of dye compounds may also be substituted with various other groups (e.g., fluorine, nitrile, hydroxy, alkyl, aryl, polycyclic, acyl, alkoxy) which are stable and do not cause decomposition of the chromophore portion of the dye compound.

The dye compounds used in this invention can be prepared by independent synthesis but they are more conveniently prepared from precursor dyes. For example, Vat Violet 7 (Color Index No. 59321) may be alkylated according to the following scheme with conventional alkylating agents:

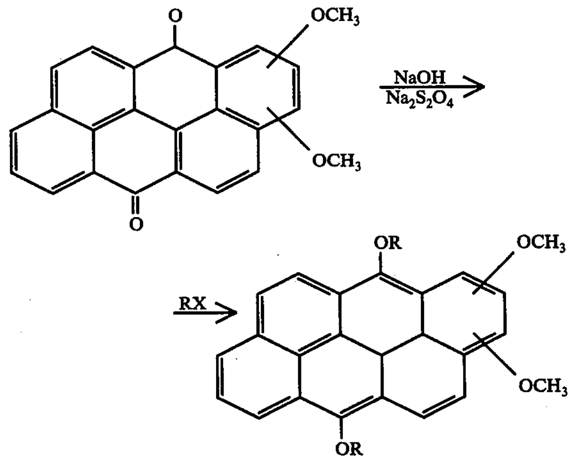

where RX represents agents such as alkyl iodide, alkyl tosylate, alkyl benzene sulfonate, and dialkyl sulfate. Other representative useful alkylated vat dyes include ethylated Vat Blue 18 (Color Index No. 59815), and ethylated Vat Green 1 (Color Index No. 59825).

To obtain compounds having R groups which are allyl, substituted allyl, propargyl, or substituted propargyl, alkylating agents such as allyl bromide and propargyl bromide may be used in the above reaction scheme.

To obtain compounds wherein R and R′ represent cycloalkyl radicals the dianion may be reacted with acrivated cycloalkyl halides, such as 2-chlorocyclohexanone, using the above reaction scheme. The resulting product has the following formula:

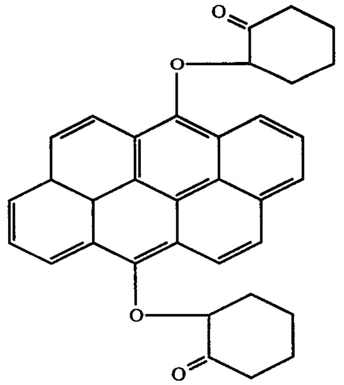

This product may be subsequently reduced via a Wolff-Kischner type reaction to yield a compound of the following formula:

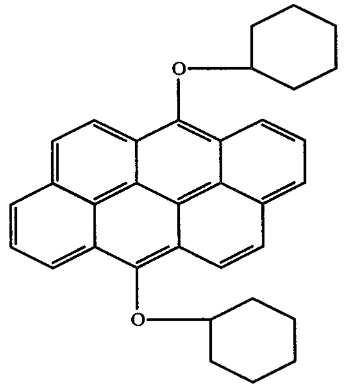

To form an acyl derivative the vat dye is first reduced in the presence of zinc metal and an acid (e.g., acetic acid) followed by reaction of the reduced compound with an anhydride (e.g., acetic anhydride). Various other of such dye compounds can also be prepared using techniques well known in the art.

Other useful aromatic dyes not having the foregoing chemical make-up include, for example, octaphenyltetrazaphorphyrin and erythrosin, which also exhibit a "development characteristic" of at least 150 seconds.

The amount of polycyclic aromatic dye present in the receptor sheet may be defined as an effective amount (i.e., an amount sufficient to reduce the increase in background optical density upon prolonged exposure on an overhead projector). Generally speaking, the tendency of the background optical density to increase is inversely proportional to the amount of aromatic dye present in the receptor. Thus, even minute amounts of dye present provide some usefulness. The maximum amount of dye present is determined either by the solubility limit of the dye in the binder or by the presence of an undesirable colored tint in the sheet due to the dye. Within these limits the preferred amount of aromatic dye present is about 0.00007 to 0.005 parts by weight per part of metal soap present.

The invention is illustrated by means of the following examples which are considered non-limiting, wherein the term "parts" refers to parts by weight unless otherwise indicated.

EXAMPLE 1

A suitable receptor sheet is prepared using silver behenate, hindered phenol reducing agent, and an alkylated vat dye. The silver behenate dispersion was prepared using the following ingredients in the amounts shown:

| | Parts |
|---|---|
| Silverbehenate | 12.00 |
| Tetrachlorophthalic anhydride (development modifier) | 0.24 |
| Stannous stearate | 0.0072 |
| Methylethylketone | 87.7528 |
| | 100.0000 |

The above intredients were mixed for ½ hour, then homogenized at 8000 psi, cooled to 80° F., and homogenized again at 8000 psi.

A binder solution was prepared with the following ingredients:

| | Parts |
|---|---|
| "Cellit PR-700" ® cellulose propionate resin (available from Bayer) | 7.50 |
| "Elvacite 2042" ® polyethylmethacrylate resin (available from E. I. du Pont) | 7.50 |
| Methylethylketone | 85.00 |
| | 100.00 |

A coating composition is then prepared using the following ingredients:

| | Parts |
|---|---|
| Silver behenate dispersion | 54.5851 |
| Binder solution | 43.6400 |
| Phthalazinone (toner for silver image) | 0.9819 |
| 2,6-di-t-butyl-p-cresol | 0.7850 |
| Butylated Vat Violet 7 (Color Index No. 59321) dye | 0.0080 |
| | 100.0000 |

The above ingredients were thoroughly blended and then coated onto a transparent plastic film at an orifice of 6 mils (150 microns) and dried in a forced air oven (3 minutes at 180° F.) to leave a dried, clear and transparent coating of 0.0013 grams per square centimeter.

A top coating is then preferably applied using a 5% solution of cellulose acetate propionate in methylethylketone (coated at a wet thickness of 50 microns and dried to leave a dry coating of 5 microns).

EXAMPLE 2

An intermediate sheet is prepared using a coating composition comprising:

| | Parts |
|---|---|
| Cellulose acetate butyrate | 7.887 |
| Solvent (methylethylketone) | 91.00 |
| Adduct of 4-methoxy-1-naphthol and dihydropyran (equimolar) | 0.717 |
| Tris-(tribromomethyl)-s-triazine | 0.58 |
| Spectral sensitizer (perylene) | 0.052 |
| Acid acceptor (diphenylguanidine) | 0.016 |

The above composition is coated onto a clear polyester film from a 3 mil (75 microns) coating orifice and dried, all operations being conducted under appropriate sale light, to provide a photosensitive intermediate sheet.

The coated surface of the resulting intermediate sheet is then placed in contact with a printed original having light-absorptive image areas on a reflective white background, followed by uniformly exposing through the intermediate (i.e., in reflex position) to intense illumination from a bank of tungsten filament lamps for a time just sufficient to sensitize the coating completely at the background areas. A typical exposure time is 12–15 seconds. The image areas are also affected but to a significantly lesser extent due to absorption in the image areas of the original of a portion of the illumination. The exposed intermediate sheet is then placed with its coated surface against the coated fact of the receptor sheet of Example 1 (e.g., between rolls or platens) and heated for 4–5 seconds at 125°–140° C. A sharp negative copy of the graphic original is obtained on the receptor sheet.

The receptor sheet is then placed on a "Model AR66" overhead projector (available from Minnesota Mining and Manufacturing Company) for 16 hours with no perceptible increase in background optical density.

This result is distinguished from that observed when the example is repeated using a receptor sheet having no polycyclic aromatic dye therein. In this latter case there was a 1000% increase in background optical density when left on the above projector for 16 hours.

EXAMPLES 3–7

Several receptor sheets were prepared, each having a different amount of polycyclic aromatic dye therein. A stock solution was first prepared using the following ingredients:

| | Parts |
|---|---|
| Silver behenate dispersion from Example 1 | 54.585 |
| Phthalazinone | 0.982 |
| Binder solution from Example 1 | 43.585 |
| 2,6-di-t-butyl-p-cresol (hindered phenol reducing agent) | 0.793 |

To similar samples of the above stock solution (each sample containing 25 grams of silver behenate soap) were added varying amounts of butylated Vat Violet 7 (polycyclic aromatic dye), as shown in Table I:

TABLE I

| Example No. | Polycyclic Dye Added (Grams) |
|---|---|
| 3 | 0 |
| 4 | 0.002 |
| 5 | 0.004 |
| 6 | 0.008 |
| 7 | 0.016 |

Each solution was then knife coated onto separate samples of 2 mil (50 microns) thick polyester film using a 100 micron orifice. The samples were then air dried at 190° F. (88° C.) to leave a dried coating 20 microns thick, after which a protective top coating of cellulose acetate butyrate was applied (5 microns, dry thickness).

The resulting receptor sheets were then separately heated against previously exposed photosensitive intermediate sheets of the type described in Example 2. The so-imaged receptor sheets were then each placed on a "Model AR66" overhead projector and the background optical density of each sample after 4, 12 and 30 hours was compared to the initial background optical density. The optical density was measured using a BacBeth densitometer (using a gold filter). The results are shown in Table II below.

TABLE II

| Example No. | % Background Optical Density Increase | | |
|---|---|---|---|
| | 4 hours | 12 hours | 30 hours |
| 3 | 200 | 500 | 1000 |
| 4 | 130 | 150 | 220 |
| 5 | 85 | 140 | 230 |
| 6 | 50 | 75 | 100 |
| 7 | 0 | 0 | 15 |

EXAMPLE 8

The receptor sheet of Example 1 is prepared except that the silver behenate is replaced with an equal amount of ferric stearate. The resulting receptor sheet is imaged using the intermediate sheet and technique of Example 2. A blue image on a buff background is obtained. Upon overhead projection the background optical density remains stable for a prolonged period.

EXAMPLE 9

A receptor sheet is prepared and imaged according to Example 8 except that the ferric stearate is replaced with an equal amount of gold stearate. A purplish-black image on a pale purple background is obtained. Upon prolonged overhead projection the background optical density remains stable.

EXAMPLE 10

A receptor sheet is prepared and imaged according to Example 8 except that the ferric stearate is replaced with an equal amount of cerium stearate. A blue image on a colorless background is obtained. Upon prolonged overhead projection the background optical density remains stable.

EXAMPLE 11

A receptor sheet is prepared and imaged according to Example 1 except that the 2,5-di-t-butyl-p-cresol is replaced with 0.785 parts by weight of 4,4′-methylene-bis-2,6-di-t-butylphenol. Upon imaging of the receptor using the technique of Example 2 a dense black image is obtained. Upon prolonged overhead projection the background optical density remains stable.

When this example is repeated, but without the presence of butylated Vat Violet 7 (Color Index No. 59321) in the receptor sheet, the background optical density increases approximately ten-fold after 12 hours of overhead projection.

EXAMPLES 12–13

Two separate receptor sheets are prepared using the procedure of Example 1, except that one sample (Example 12) contained no polycyclic aromatic dye and the other sample (Example 13) contained ethylated Vat Blue 18 in place of burylated Vat Violet 7. Upon imaging in accordance with Example 2 a dense black image was obtained. Upon overhead projection the background optical density at various times was measured. The results are shown in Table III.

TABLE III

| Example No. | Initial | Background Optical Density | |
|---|---|---|---|
| | | 4 Hours | 12 Hours |
| 12 | 0.10 | 0.16 | 0.54 |
| 13 | 0.07 | 0.08 | 0.11 |

EXAMPLES 14–15

Two separate receptor sheets are prepared using the procedure of Example 1, except that one sample (Example 14) contained no polycyclic aromatic dye and the other sample (Example 15) contained octaphenyltetrazaporphyrin in place of butylated Vat Violet 7. After imaging as in Example 2, the receptor was placed on an overhead projector for a prolonged period and the background optical density was measured at various times. The results are shown in Table IV.

TABLE IV

| | Background Optical Density | | |
|---|---|---|---|
| Example No. | Initial | 4 Hours | 12 Hours |
| 14 | 0.06 | 0.14 | 1.15 |
| 15 | 0.06 | 0.07 | 0.09 |

Other variants are possible within the scope of the present invention.

What is claimed is:

1. In an imageable receptor sheet comprising a transparent backing having a coating thereover including a film-forming binder, reducible metal soap and an organic reducing agent, the improvement comprising including in said coating from about 0.00007 to 0.005 parts by weight per part of reducible metal soap of a polycyclic aromatic dye compound for the purpose of stabilizing the imaged sheet against background darkening upon prolonged exposure to heat and light, said polycyclic aromatic dye compound exhibiting a development characteristic of at least 150 seconds.

2. The improvement in accordance with claim 1, wherein said dye compound comprises at least two moieties in conjugate relationship as part of a single chromophore, each said moiety comprising three linearly kata condensed six-membered aromatic rings having an —OZ group attached to the meso position of each said moiety, wherein Z is a stable, monovalent radical and wherein said —OZ group is a solubilizing group for said dye compound.

3. The improvement in accordance with claim 1, wherein said dye compound is of the formula

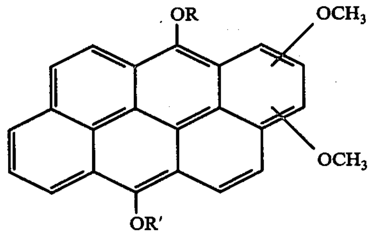

where R and R' are lower alkyl.

4. The improvement in accordance with claim 3, wherein R is butyl.

5. The improvement in accordance with claim 1, wherein said dye compound is selected from the group consisting of octaphenyltetrazaporphyrin and erythrosin.

6. The improvement in accordance with claim 1, wherein said reducible metal soap is selected from the group consisting of silver behenate, silver stearate, ferric stearate, gold stearate and cerium stearate.

7. The improvement in accordance with claim 1, wherein said organic reducing agent comprises a hindered phenol.

8. The improvement in accordance with claim 7, wherein said organic reducing agent is selected from the group consisting of 4-methoxy-1-naphthol, 2,6-di-t-butyl-p-cresol, and 4,4'-methylene-bis-2,6-di-t-butylphenol.

9. The improvement in accordance with claim 1, wherein said dye compound comprises ethylated Vat Blue 18 (Color Index No. 59815).

10. The improvement in accordance with claim 1 wherein said transparent backing comprises polyester film.

* * * * *

UNITED STATES PATENT AND TRADEMARK OFFICE

Certificate

Patent No. 4,082,879 Patented April 4, 1978

Terrence M. Conder & Kevin P. O'Leary

Application having been made by Terrence M. Conder and Kevin P. O'Leary, the inventors named in the patent above identified, and Minnesota Mining and Manufacturing Co., the assignee, for the issuance of a certificate under the provisions of Title 35, Section 256, of the United States Code, adding the name of Richard D. Streeper as a joint inventor, and a showing and proof of facts satisfying the requirements of the said section having been submitted, it is this 24th day of November 1981, certified that the name of the said Richard D. Streeper is hereby added to the said patent as a joint inventor with the said Terrence M. Conder and Kevin P. O'Leary.

Fred W. Sherling
*Associate Solicitor.*